United States Patent
Chen et al.

(10) Patent No.: US 10,291,308 B2
(45) Date of Patent: May 14, 2019

(54) CHANNEL STATE INFORMATION FEEDBACK METHOD, DEVICE AND SYSTEM

(71) Applicant: CHINA ACADEMY OF TELECOMMUNICATIONS TECHNOLOGY, Beijing (CN)

(72) Inventors: Runhua Chen, Beijing (CN); Qiubin Gao, Beijing (CN); Rakesh Tamrakar, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/514,817

(22) PCT Filed: Sep. 17, 2015

(86) PCT No.: PCT/CN2015/089871
§ 371 (c)(1),
(2) Date: Mar. 27, 2017

(87) PCT Pub. No.: WO2016/045535
PCT Pub. Date: Mar. 31, 2016

(65) Prior Publication Data
US 2017/0222707 A1    Aug. 3, 2017

(30) Foreign Application Priority Data
Sep. 28, 2014    (CN) .......................... 2014 1 0509463

(51) Int. Cl.
*H04B 17/00*    (2015.01)
*H04B 7/06*    (2006.01)
(Continued)

(52) U.S. Cl.
CPC ......... *H04B 7/0632* (2013.01); *H04B 7/0456* (2013.01); *H04B 7/06* (2013.01);
(Continued)

(58) Field of Classification Search
CPC .. H04B 7/0639; H04B 7/0456; H04B 7/0478; H04B 7/0626; H04B 7/0417;
(Continued)

(56) References Cited
U.S. PATENT DOCUMENTS

2014/0177744 A1    6/2014    Krishnamurthy et al.
2015/0270881 A1    9/2015    Gao
(Continued)

FOREIGN PATENT DOCUMENTS

CN    101867458 A    10/2010
CN    103152140 A    6/2013
(Continued)

OTHER PUBLICATIONS

International Search Report for PCT/CN2015/089871 dated Dec. 21, 2015 and its English translation provided by WIPO.
(Continued)

*Primary Examiner* — Ajibola A Akinyemi
(74) *Attorney, Agent, or Firm* — Ladas & Parry, LLP

(57) ABSTRACT

The present disclosure provides a CSI feedback method, a CSI feedback device and a CSI feedback system. The CSI feedback method includes steps of: configuring, by a network side device, a first downlink channel measurement pilot for a UE; and receiving, by the network side device, first PMI information fed back by the UE. The first PMI information is acquired by the UE based on measurement of the first downlink channel measurement pilot and second PMI information. A dimension represented by the first PMI information is different from a dimension represented by the second PMI information.

19 Claims, 6 Drawing Sheets

(51) Int. Cl.
H04L 1/00 (2006.01)
H04B 7/0456 (2017.01)
H04L 1/06 (2006.01)

(52) U.S. Cl.
CPC ............ *H04B 7/0639* (2013.01); *H04L 1/00* (2013.01); *H04L 1/004* (2013.01); *H04L 1/0687* (2013.01); *H04L 1/0693* (2013.01)

(58) Field of Classification Search
CPC .... H04B 7/0486; H04B 7/0632; H04B 7/063; H04B 7/0617; H04B 7/0469; H04B 7/10; H04B 7/065; H04B 7/0452
USPC ........................................................ 455/67.11
See application file for complete search history.

(56) References Cited

U.S. PATENT DOCUMENTS

| | | | | |
|---|---|---|---|---|
| 2016/0119049 A1* | 4/2016 | Cui | ...................... | H04B 7/0639 375/267 |
| 2017/0005712 A1* | 1/2017 | Jiang | .................... | H04B 7/0413 |
| 2017/0026101 A1* | 1/2017 | Kang | .................... | H04B 7/0413 |
| 2017/0353882 A1* | 12/2017 | Xia | ........................ | H04B 7/063 |

FOREIGN PATENT DOCUMENTS

| | | |
|---|---|---|
| CN | 103716078 A | 4/2014 |
| CN | 103825678 A | 5/2014 |
| CN | 103840868 A | 6/2014 |
| CN | 104065448 A | 9/2014 |
| WO | 2013/023542 A1 | 2/2013 |
| WO | 2014059944 A1 | 4/2014 |
| WO | 2014/117748 A1 | 8/2014 |

OTHER PUBLICATIONS

Written Opinion of the International Search Authority for PCT/CN2015/089871 dated Dec. 21, 2015 and its English translation provided by WIPO.

International Preliminary Report on Patentability (IPRP; Ch. 1) for PCT/CN2015/089871 dated Apr. 6, 2017, and its English translation provided by WIPO.

From EPO Application No. 15844823.3, Supplementary European Search Report and Search Opinion dated Aug. 25, 2017.

From PRC Application No. 201410509463.0, Office Action with Search Report dated Jan. 17, 2018 with machine English translation from Global Dossier.

* cited by examiner

CHANNEL STATE INFORMATION FEEDBACK METHOD, DEVICE AND SYSTEM

CROSS-REFERENCE TO RELATED APPLICATIONS

The present application is the U.S. national phase of PCT Application No. PCT/CN2015/089871 filed on Sep. 17, 2015, which claims the priority to Chinese Patent Application No. 201410509463.0 filed in China on Sep. 28, 2014, the disclosure of which are incorporated herein by reference in their entireties.

TECHNICAL FIELD

The present disclosure relates to the field of communication technology, in particular to a channel state information (CSI) feedback method, a CSI feedback device and a CSI feedback system.

BACKGROUND

In a conventional cellular system, antenna arrays of a network side device are usually arranged horizontally. Beams from a transmitter of the network side device may merely be adjusted in a horizontal direction, and are at a fixed down-tilt angle to each user in a vertical direction. Hence, various beamforming/pre-coding technologies may be performed on the basis of channel information in the horizontal direction. However, actually, a radio signal is transmitted in a space in a three-dimensional manner, so it is impossible to provide an optimal system performance through the fixed down-tilt angle. The beam adjustment in the vertical direction may play a very important role in enhancing the system performance.

Along with the development of the antenna technology, an active antenna capable of controlling each element independently has currently emerged, as shown in FIGS. 1A and 1B. FIG. 1A shows an active antenna with four ports. In FIG. 1B, a vertical dimension of a base station is segmented into three sectors, i.e., sector 1, sector 2 and sector 3, which may provide services to respective terminals therein. Each sector is allocated with a set of Channel State Information-Reference Signal (CSI-RS) resources, including several CSI-RS ports, e.g., four CSI-RS ports. Through this kind of antenna array, it is possible to dynamically adjust the beams in the vertical direction. For a Frequency Division Duplexing (FDD) or Time Division Duplexing (TDD) system, the three-dimensional beamforming/pre-coding operation needs to be performed on the basis of CSI fed back from a User Equipment (UE).

In a conventional CSI feedback approach, usually, one CSI-RS resource is configured for the network side device at each of the horizontal dimension and the vertical dimension, and each CSI-RS resource is transmitted from a set of antennae to the UE. Next, the UE measures the CSI-RS resource at the vertical dimension and generates the corresponding CSI, and measures the CSI-RS resource at the horizontal dimension and generating the corresponding CSI. Then, the network side device acquires information about downlink three-dimensional Multiple Input Multiple Output (3D-MIMO) beamforming based on the vertical-dimension CSI and the horizontal-dimension CSI from the UE.

In the above-mentioned feedback approach, the UE needs to feed back two pieces of CSI, each including a Rank Indicator (RI), a Pre-coding Matrix Indicator (PMI) and a Channel Quality Indicator (CQI), so there is a relatively large uplink feedback overhead.

SUMMARY

In view of the above, the present disclosure provides a CSI feedback method, a CSI feedback device and a CSI feedback system, so as to reduce the uplink feedback overhead as compared with the conventional CSI feedback approach.

In a first aspect, the present disclosure provides in some embodiments a CSI feedback method. The CSI feedback method includes: configuring, by a network side device, a first downlink channel measurement pilot for a UE; and receiving, by the network side device, first PMI information fed back by the UE, the first PMI information being acquired by the UE based on measurement of the first downlink channel measurement pilot and second PMI information. A dimension represented by the first PMI information is different from a dimension represented by the second PMI information.

According to the CSI feedback method in the embodiments of the present disclosure, it is merely necessary for the UE to feed the first PMI information back to the network side device to enable the network side device to perform a beamforming operation based on the first PMI information. As a result, it is possible to remarkably reduce an uplink feedback overhead as compared with the related art.

According to the first aspect, in a possible embodiment of the present disclosure, the CSI feedback method further includes performing, by the network side device, a beamforming operation on a signal to be transmitted to the UE based on the first PMI information and the second PMI information.

According to the first aspect, in a possible embodiment of the present disclosure, the CSI feedback method further includes receiving, by the network side device, CQI information fed back by the UE, the CQI information being determined by the UE based on the first PMI information and the second PMI information.

According to the first aspect, in a possible embodiment of the present disclosure, the CSI feedback method further includes performing, by the network side device, a link adjustment on the signal to be transmitted to the UE based on the CQI information.

According to the first aspect, in a possible embodiment of the present disclosure, the CSI feedback method further includes configuring, by the network side device, second PMI information for the UE to enable the UE to determine the first PMI information based on the second PMI information configured for the UE and the first downlink channel measurement pilot and determine the CQI information based on the first PMI information and the second PMI information configured for the UE.

In a possible embodiment of the present disclosure, a step of determining, by the network side device, the second PMI information includes: receiving, by the network side device, the second PMI information reported by the UE; or measuring, by the network side device, an uplink signal from the UE so as to determine the second PMI information.

In a possible embodiment of the present disclosure, the CSI feedback method further includes, prior to receiving, by the network side device, the second PMI information reported by the UE: configuring, by the network side device, a second downlink channel measurement pilot for the UE, so as to enable the UE to determine the second PMI information based on the second downlink channel measurement pilot; or configuring, by the network side device, a two-dimensional joint antenna array downlink channel measurement pilot for the UE, so as to enable the UE to determine the second PMI information based on the two-dimensional joint antenna array downlink channel measurement pilot.

In a possible embodiment of the present disclosure, the step of configuring, by the network side device, the second PMI information for the UE includes: transmitting, by the network side device, the second PMI information to the UE to enable the UE to determine the first PMI information based on the received second PMI information, the first downlink channel measurement pilot and the second downlink channel measurement pilot in the event that the network side device configures the second downlink channel measurement pilot for the UE, and enable the UE to determine the first PMI information based on the received second PMI information and the two-dimensional joint antenna array downlink channel measurement pilot in the event that the network side device configures the two-dimensional joint antenna array downlink channel measurement pilot for the UE; or notifying, by the network side device, the UE to use the second PMI information determined by the UE to enable the UE to determine the first PMI information based on the second PMI information determined by the UE, the first downlink channel measurement pilot and the second downlink channel measurement pilot in the event that the network side device configures the second downlink channel measurement pilot for the UE, and enable the UE to determine the first PMI information based on the second PMI information determined by the UE and the two-dimensional joint antenna array downlink channel measurement pilot in the event that the network side device configures the two-dimensional joint antenna array downlink channel measurement pilot for the UE.

In a second aspect, the present disclosure provides in some embodiments a CSI feedback method, including steps of: determining, by a UE, first PMI information based on second PMI information and a first downlink channel measurement pilot configured by a network side device; and feeding, by the UE, the first PMI information back to the network side device. A dimension represented by the first PMI information is different from a dimension represented by the second PMI information.

According to the CSI feedback method in the embodiments of the present disclosure, it is merely necessary for the UE to feed the first PMI information back to the network side device, so as to enable the network side device to perform a beamforming operation based on the first PMI information. As a result, it is possible to remarkably reduce an uplink feedback overhead as compared with the related art.

In a possible embodiment of the present disclosure, the CSI feedback method further includes: determining, by the UE, CQI information based on the first PMI information and the second PMI information; and feeding, by the UE, the CQI information back to the network side device.

In a possible embodiment of the present disclosure, a step of determining, by the UE, the second PMI information includes: measuring, by the UE, a downlink pilot signal so as to determine the second PMI information; or determining, by the UE, the second PMI information based on second PMI information configured by the network side device.

In a possible embodiment of the present disclosure, the step of measuring, by the UE, the downlink pilot signal so as to determine the second PMI information includes measuring, by the UE, a second downlink channel measurement pilot or a two-dimensional joint antenna array downlink channel measurement pilot configured by the network side device, so as to determine the second PMI information. The step of determining, by the UE, the first PMI information based on the second PMI information and the first downlink channel measurement pilot configured by the network side device includes: determining, by the UE, the first PMI information based on the second PMI information, and the first downlink channel measurement pilot configured by the network side and the second downlink channel measurement pilot; or measuring, by the UE, a downlink pilot signal based on the second PMI information and the two-dimensional joint antenna array downlink channel measurement pilot configured by the network side device, so as to determine the first PMI information.

In a possible embodiment of the present disclosure, the CSI feedback method further includes, subsequent to the step of measuring, by the UE, the downlink pilot signal so as to determine the second PMI information: reporting, by the UE, the determined second PMI information to the network side device.

In a possible embodiment of the present disclosure, the CSI feedback method further includes, subsequent to the step of reporting, by the UE, the determined second PMI information to the network side device: after the UE receives the second PMI information from the network side device, using the received second PMI information as second PMI information for determining the first PMI information and the CQI information; or after the UE receives an acknowledgement message from the network side device, using the reported second PMI information as second PMI information for determining the first PMI information and the CQI information.

In a third aspect, the present disclosure provides in some embodiments a network side device. The network side device includes: a configuration module configured to configure a first downlink channel measurement pilot for a UE; and a reception module configured to receive first PMI information from the UE, the first PMI information being acquired by the UE based on measurement of the first downlink channel measurement pilot and second PMI information. A dimension represented by the first PMI information is different from a dimension represented by the second PMI information.

According to the network side device in the embodiments of the present disclosure, it is merely necessary for the UE to feed back the first PMI information to the network side device, so as to enable the network side device to perform a beamforming operation based on the first PMI information. As a result, it is possible to remarkably reduce an uplink feedback overhead as compared with the related art.

In a possible embodiment of the present disclosure, the network side device further includes a processing module configured to perform a beamforming operation on a signal to be transmitted to the UE based on the first PMI information and the second PMI information.

In a possible embodiment of the present disclosure, the reception module is further configured to receive CQI information fed back by the UE, the CQI information being determined by the UE based on the first PMI information and the second PMI information.

In a possible embodiment of the present disclosure, the processing module is further configured to perform a link adjustment on the signal to be transmitted to the UE based on the CQI information.

In a possible embodiment of the present disclosure, the configuration module is further configured to configure second PMI information for the UE, so as to enable the UE to determine the first PMI information based on the second PMI information and the first downlink channel measurement pilot configured for the UE and determine the CQI information based on the first PMI information and the second PMI information configured for the UE.

In a possible embodiment of the present disclosure, the network side device further includes a determination module configured to receive the second PMI information reported by the UE; or measure an uplink signal from the UE so as to determine the second PMI information.

In a possible embodiment of the present disclosure, the configuration module is further configured to, before the determination module receives the second PMI information reported by the UE, configure a second downlink channel measurement pilot for the UE, so as to enable the UE to determine the second PMI information based on the second downlink channel measurement pilot; or configure a two-dimensional joint antenna array downlink channel measurement pilot for the UE, so as to enable the UE to determine the second PMI information based on the two-dimensional joint antenna array downlink channel measurement pilot.

In a possible embodiment of the present disclosure, the configuration module is further configured to: transmit the second PMI information to the UE to, enable the UE to determine the first PMI information based on the configured second PMI information, the first downlink channel measurement pilot and the second downlink channel measurement pilot in the event that the network side device configures the second downlink channel measurement pilot for the UE, and enable the UE to determine the first PMI information based on the configured second PMI information and the two-dimensional joint antenna array downlink channel measurement pilot in the event that the network side device configures the two-dimensional joint antenna array downlink channel measurement pilot for the UE; or notify the UE to use the second PMI information determined by the UE to enable the UE to determine the first PMI information based on the second PMI information determined by the UE, the first downlink channel measurement pilot and the second downlink channel measurement pilot in the event that the network side device configures the second downlink channel measurement pilot for the UE, and enable the UE to determine the first PMI information based on the second PMI information determined by the UE and the two-dimensional joint antenna array downlink channel measurement pilot in the event that the network side device configured the two-dimensional joint antenna array downlink channel measurement pilot for the UE.

In a fourth aspect, the present disclosure provides in some embodiments a UE. The UE includes: a first determination module configured to determine first PMI information based on second PMI information and a first downlink channel measurement pilot configured by a network side device; and a transmission module configured to feed the first PMI information back to the network side device. A dimension represented by the first PMI information is different from a dimension represented by the second PMI information.

According to the UE in the embodiments of the present disclosure, it is merely necessary for the UE to feed the first PMI information back to the network side device, so as to enable the network side device to perform a beamforming operation based on the first PMI information. As a result, it is possible to remarkably reduce an uplink feedback overhead as compared with the related art.

In a possible embodiment of the present disclosure, the first determination module is further configured to determine CQI information based on the first PMI information and the second PMI information, and the transmission module is further configured to feed the CQI information back to the network side device.

In a possible embodiment of the present disclosure, the UE further includes a second determination module configured to measure a downlink pilot signal so as to determine the second PMI information, or determine the second PMI information based on second PMI information configured by the network side device.

In a possible embodiment of the present disclosure, the second determination module is further configured to measure a downlink pilot signal based on a second downlink channel measurement pilot or a two-dimensional joint antenna array downlink channel measurement pilot configured by the network side device, so as to determine the second PMI information. The first determination module is further configured to determine the first PMI information based on the second PMI information and the first downlink channel measurement pilot and the second downlink channel measurement pilot configured by the network side device, or measure the downlink pilot signal based on the second PMI information and the two-dimensional joint antenna array downlink channel measurement pilot configured by the network side device so as to determine the first PMI information.

In a possible embodiment of the present disclosure, the transmission module is further configured to report the determined second PMI information to the network side device, after the second determination module measures the downlink pilot signal and determines the second PMI information.

In a possible embodiment of the present disclosure, after the transmission module has reported the determined second PMI information to the network side device, the UE further includes a third determination module configured to, after the transmission module reports the determined second PMI information to the network side device: after receiving the second PMI information from the network side device, determine the received second PMI information as second PMI information for determining the first PMI information and the CQI information; or after receiving an acknowledgement message from the network side device, use the reported second PMI information as second PMI information for determining the first PMI information and the CQI information.

In a fifth aspect, the present disclosure provides in some embodiments a CSI feedback system. The CSI feedback system includes a network side device and a UE. The network side device is configured to configure a first downlink channel measurement pilot for the UE, and receive first PMI information fed back by the UE. The UE is configured to determine the first PMI information based on second PMI information and the first downlink channel measurement pilot configured by the network side device, and feed the first PMI information back to the network side device. A dimension represented by the first PMI information is different from a dimension represented by the second PMI information.

According to the CSI feedback system in the embodiments of the present disclosure, it is merely necessary for the UE to feed the first PMI information back to the network side device, so as to enable the network side device to perform a beamforming operation based on the first PMI information. As a result, it is possible to remarkably reduce an uplink feedback overhead as compared with the related art.

In a sixth aspect, the present disclosure provides in some embodiments a network side device. The network side device includes: a processor; a memory connected to the processor via a bus interface and configured to store programs and data used when the processor performs an operation; and a transceiver connected to the processor and the memory via the bus interface and configured to receive and transmit the data under the control of the processor. The processor is further configured to call and execute the programs and data stored in the memory, so as to: configure a first downlink channel measurement pilot for a UE, and receive first PMI information from the UE. The first PMI information is acquired by the UE based on measurement of the first downlink channel measurement pilot and second PMI information. A dimension represented by the first PMI information is different from a dimension represented by the second PMI information.

According to the network side device in the embodiments of the present disclosure, it is merely necessary for the UE to feed the first PMI information back to the network side device, so as to enable the network side device to perform a beamforming operation based on the first PMI information. As a result, it is possible to remarkably reduce an uplink feedback overhead as compared with the related art.

In a seventh aspect, the present disclosure provides in some embodiments a UE. The UE includes: a processor; a memory connected to the processor via a bus interface and configured to store programs and data used when the processor performs an operation; and a transceiver connected to the processor and the memory via the bus interface and configured to receive and transmit the data under the control of the processor. The processor is further configured to call and execute the programs and data stored in the memory, so as to determine first PMI information based on second PMI information and a first downlink channel measurement pilot configured by a network side device, and feed the first PMI information back to the network side device. A dimension represented by the first PMI information is different from a dimension represented by the second PMI information.

According to the UE in the embodiments of the present disclosure, it is merely necessary for the UE to feed the first PMI information back to the network side device, so as to enable the network side device to perform a beamforming operation based on the first PMI information. As a result, it is possible to remarkably reduce an uplink feedback overhead as compared with the related art.

DETAILED DESCRIPTION OF THE EMBODIMENTS

Figure 1A:
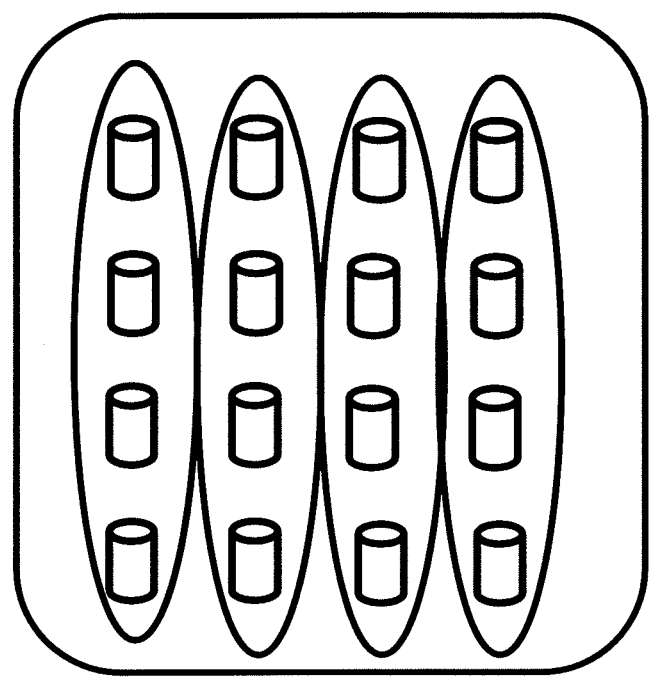
FIG. 1A is a schematic view showing a four-port antenna as mentioned in the Background section.
Figure 1B:
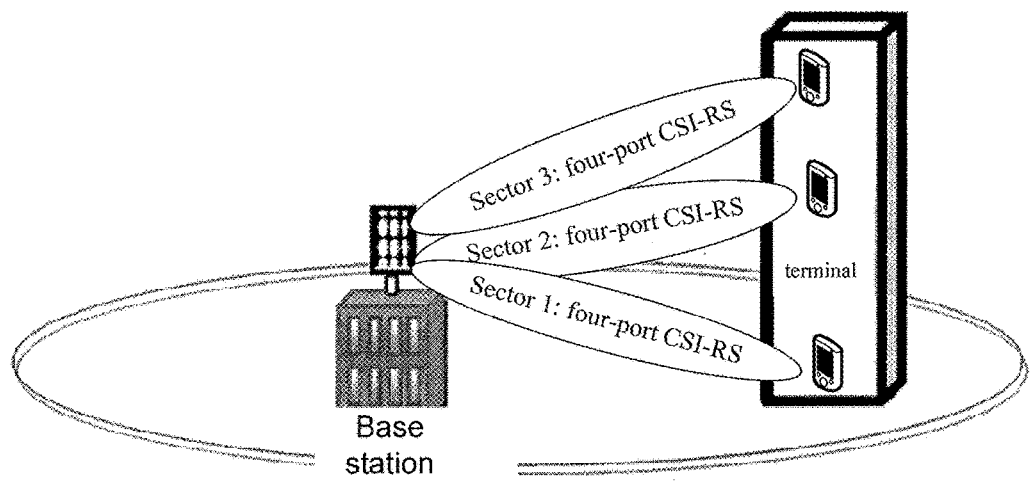
FIG. 1B is a schematic view showing a vertical dimension segmented into three sectors as mentioned in the Background section.

In order to make the objects, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain other embodiments, which also fall within the scope of the present disclosure.

In the embodiments of the present disclosure, a network side device may configure a first downlink channel measurement pilot for a UE and receive first PMI information from the UE. The first PMI information is acquired by the UE based on second PMI information and measurement of the first downlink channel measurement pilot, and a dimension represented by the first PMI information is different from a dimension represented by the second PMI information. The network side device only receives the first PMI information, which is acquired by the UE based on the second PMI information and the measurement of the first downlink channel measurement pilot, from the UE, and then process a signal to be transmitted to the UE based on the first PMI information. As compared with the related art where two or more pieces of CSI including a RI, a PMI and a CQI need to be fed back, it is possible to remarkably reduce an uplink feedback overhead. In addition, the first PMI information is selected by the UE from a codebook of a first dimension based on the second PMI information and the measurement information about the first downlink channel measurement pilot, and the first PMI information corresponds to a beamforming vector achieving an optimal beamforming performance. In the related art, PMI1 is acquired by merely measuring a CSI-RS resource in the horizontal dimension or the vertical dimension, and is irrelevant to a CSI-RS resource in the other dimension. When an evolved Node Base (eNB) performs the beamforming operation using the PMI1 and PMI of the other dimension, there is a relatively low probability to achieve an optimal beamforming effect. Hence, the first PMI information in the embodiments of the present disclosure is more accurate than the PMI1 in the related art. Further, the network side device may perform the beamforming operation on the signal to be transmitted to the UE based on the first PMI information and the second PMI information, and receive CQI information from the UE. The CQI information is acquired by the UE based on the first PMI information and the second PMI information. Hence, the network side device may directly perform a link adjustment on the signal to be transmitted to the UE based on the CQI information, so as to remarkably simplify the network side device.

For ease of understanding the scheme in the embodiments of the present disclosure, CSI will be described hereinafter at first.

CSI includes a RI, a PMI and a CQI. The RI is used to represent the number of downlink code streams capable of being supported by the UE, the PMI is used to represent an index number of a pre-coding matrix in a codebook fed from the UE, and the CQI is used to represent the strength of a signal that may be received by the UE in the event that the RI/PMI is subjected to an MIMO encoding operation. The CQI must be determined on the basis of the RI/PMI, and may represent signal strength, e.g., Signal to Interference plus Noise Ratio (SINR), Modulation and Coding Scheme that may be accepted, or any other characteristics. The number of CQI may be adjusted based on the RI. For example, if RI=1, it means that the UE may receive one code stream, and merely one CQI may be fed back to the network side device. If RI>1, it means that the UE may receive more than one code streams, and more than one CQIs may be fed back. In an existing LTE standard, if RI>1, two CQIs may be fed back.

The embodiments of the present disclosure will be further described hereinafter in conjunction with the drawings.

In the following embodiments, the implementation of the network side device will precede the implementation of the UE.

Figure 2:
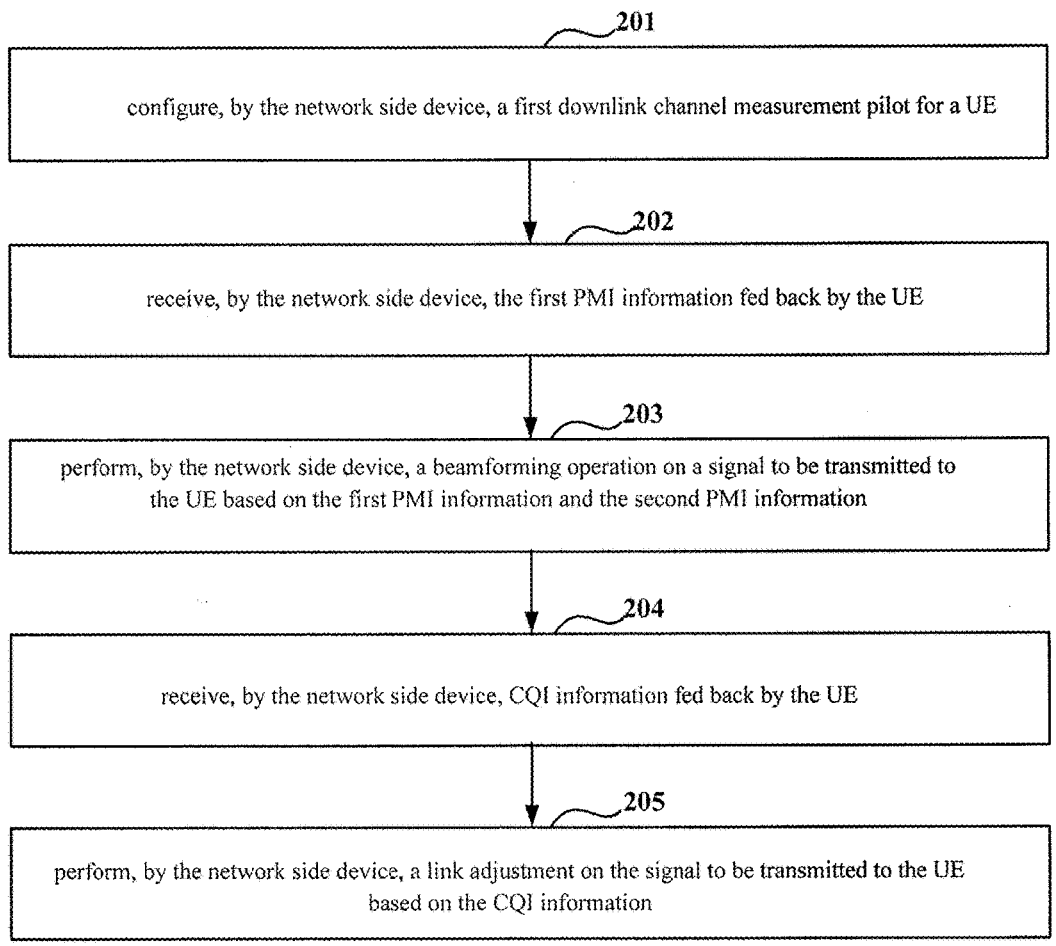
FIG. 2 is a flow chart of a CSI feedback method for a network side device according to embodiments of the present disclosure.

Referring to FIG. 2, the present disclosure provides in some embodiments a CSI feedback method for a network side device, which includes the following steps.

Step 201: configure, by the network side device, a first downlink channel measurement pilot for a UE. The first downlink channel measurement pilot includes a CSI-RS resource or a Cell-specific Reference Symbol (CRS), and any other downlink channel measurement pilot that may be used to acquire the CSI through channel measurement, which is limited herein.

In the event that the first downlink channel measurement pilot is a CSI-RS resource, the network side device may configure the first downlink channel measurement pilot for the UE based on the number of antenna ports in individual dimensions. The first downlink channel measurement pilot may be a single-dimension CSI-RS resource (e.g., a vertical-dimension CSI-RS resource or a horizontal-dimension CSI-RS resource), or a two-dimension joint antenna array CSI-RS resource.

Taking a network side device which is a 4*8 antenna array as an example (e.g., four antennae in the vertical dimension, eight antennae in the horizontal dimension, and 32 antennae in total), at step 201, the first downlink channel measurement pilot configured by the network side device for the UE may be a four-port vertical-dimension CSI-RS resource, or an eight-port CSI-RS resource, or a 32-port CSI-RS resource which is the two-dimension joint antenna array downlink channel measurement pilot.

Further, in the case of being configured at a high layer, each CSI-RS resource is provided with a set of configuration parameters, including periodicity (e.g., the number of subframes in a transmission period), an offset (e.g., a position of a starting subframe) and a CSI-RS index (e.g., the number of the available CSI-RS resource that is configured). The CSI-RS resources in different dimensions may have an identical period or different periods. Usually, the UE may move faster in a horizontal direction and slower in a vertical direction, so the horizontal-dimension CSI-RS resource may be configured with a shorter period and the vertical-dimension CSI-RS resource may be configured with a longer period, and the UE may measure and generate a feedback message for the vertical-dimension resource at a lower frequency.

Step 202: receive, by the network side device, the first PMI information from the UE. The first PMI information is acquired by the UE based on the measurement of the first downlink channel measurement pilot. A dimension represented by the first PMI information is different from a dimension represented by the second PMI information.

In this case, the UE may transmit the first PMI information and a code stream measured based on the first downlink channel measurement pilot and that can be supported by the UE, i.e., a first RI, to the network side device.

In addition, in the event that the first PMI information is horizontal-dimension PMI information, the second PMI information is vertical-dimension PMI information, and in the event that the first PMI information is vertical-dimension PMI information, the second PMI information is horizontal-dimension PMI information.

Step 203: perform, by the network side device, a beamforming operation on a signal to be transmitted to the UE based on the first PMI information and the second PMI information.

To be specific, the network side device may perform the beamforming operation on the signal to be transmitted to the UE based on a pre-coding matrix acquired on the basis of the first PMI information and the second PMI information.

When the UE transmits the first RI to the network side device, the network side device may perform the beamforming operation on the signal to be transmitted to the UE based on a pre-coding matrix acquired on the basis of the first PMI information, the first RI and the second PMI information.

It should be appreciated that, step 203 is a preferred step in the embodiments of the present disclosure.

Step 204: receive, by the network side device, CQI information from the UE. The CQI information is determined by the UE based on the first PMI information and the second PMI information.

It should be appreciated that, step 204 is a preferred step in the embodiments of the present disclosure, and an order of step 204 and steps 202-203 is not particularly limited herein, i.e., step 204 may be performed after, before or at the same time with step 202, or performed after, before or at the same time with Step 203.

Upon the receipt of the CQI information, the network side device may process the signal to be transmitted to the UE based on the CQI information.

Step 205: perform, by the network side device, a link adjustment on the signal to be transmitted to the UE based on the CQI information.

To be specific, in step 205, the network side device may perform a downlink adjustment on the signal to be transmitted to the UE based on the CQI information.

It should be appreciated that, step 205 is a preferred step in the embodiments of the present disclosure.

The CQI information is determined by the UE based on the first PMI information and the second PMI information, so upon the receipt of the CQI information, the network side device may perform the downlink adjustment on the signal to be transmitted to the UE directly using the CQI information. As compared with the related art, it is unnecessary to determine the CQI information for the link adjustment on each UE based on the PMI information in the CSI from the UE, so it is possible to remarkably simplify the network side device.

In a possible embodiment of the present disclosure, the network side device may configure the second PMI information for the UE, so as to enable the UE to determine the first PMI information based on the second PMI information configured for the UE and the first downlink channel measurement pilot, and determine the CQI information based on the first PMI information and the second PMI information configured for the UE.

In a possible embodiment of the present disclosure, the network side device may determine the second PMI information in step 203 and/or that configured for the UE in one of the following two approaches, or a combination thereof.

First Approach

The network side device may receive the second PMI information reported by the UE, and then determine the second PMI information in step 203 and/or that configured for the UE based on the reported second PMI information.

In this case, the network side device may also receive a second RI from the UE. A dimension represented by the first RI is different from a dimension represented by the second RI.

Second Approach

The network side device may measure an uplink signal from the UE, so as to determine the second PMI information.

The uplink signal may be an uplink pilot signal, e.g., a Sounding Reference Signal (SRS), or a Demodulation Reference Symbol (DRS) transmitted along with a Physical Uplink Shared Channel (PUSCH).

Further, in the above second approach, the determination of the second PMI information may be achieved through the following steps.

First step: measure, by the network side device, the uplink signal from the UE, so as to overall (complete) channel information.

Second step: determine a second dimension channel-related matrix R based on the overall channel information, perform eigenvalue decomposition on the second dimension channel-related matrix R, and take an eigenvector obtained after the eigenvalue decomposition as the second PMI.

It should be appreciated that, the determination of the second PMI information through the above two steps is merely a possible way in the embodiments of the present disclosure, and the network side device may measure the uplink signal from the UE so as to determine the second PMI information in any other ways, which is not limited herein.

In the event that the above first and second approaches are used in combination, the second PMI information obtained in the first and second approaches may be processed on the basis of a preset algorithm (e.g., an averaging process, or an extremum (e.g., maximum or minimum value) calculation process) so as to obtain final second PMI information, and then this final second PMI information may be taken as the second PMI information in step 203 and/or that configured for the UE.

It should be appreciated that, the determination of the second PMI information in Step 203 and/or that configured for the UE by the network side device is not limited to the above-mentioned first and second approaches, and any other modes may also be used, which is not limited herein.

In a possible embodiment of the present disclosure, the above-mentioned second approach may be applied to an uplink/downlink channel reciprocity system. For the uplink/downlink channel reciprocity system, uplink and downlink channels have identical characteristics, so the second PMI information acquired by the network side device through measuring the uplink signal is equivalent to the second PMI information acquired by the UE through the measurement of the downlink pilot signal, i.e., the second PMI information may be determined in the above-mentioned second approach.

It should be appreciated that, in the embodiments of the present disclosure, the uplink/downlink channel reciprocity system includes a TDD system, or a FDD system where a difference between an uplink frequency and a downlink frequency is small relative to a carrier frequency (in this case, the uplink channel is equivalent to the downlink channel to some extent, i.e., the uplink and downlink channels have identical characteristics).

In addition, in the event that the first downlink channel measurement pilot configured by the network side device at step 201 for the UE is a joint antenna array CSI-RS resource, the UE may determine and report the second PMI information directly using the joint antenna array CSI-RS resource.

In a possible embodiment of the present disclosure, in the event that the network side device determines the second PMI information in the above-mentioned first approach, the network side device may, prior to receiving the second PMI information reported by the UE, configure a resource for the UE in one of the following two resource configuration approaches to facilitate the UE reporting the second PMI information. Of course, the resource may also be configured in any other approaches, as long as the UE can determine the second PMI information to be reported based on the resource.

Resource configuration approach 1: the network side device may configure a second downlink channel measurement pilot for the UE, so as to enable the UE to determine the second PMI information based on the second downlink channel measurement pilot.

Resource configuration approach (2): the network side device may configure a two-dimension joint antenna array downlink channel measurement pilot for the UE, so as to enable the UE to determine the second PMI information based on the two-dimension joint antenna array downlink channel measurement pilot.

It should be appreciated that, in the event that the two-dimension joint antenna array downlink channel measurement pilot has been configured by the network side device for the UE in step 201, the UE may determine the second PMI information based on the joint antenna array downlink channel measurement pilot, so the two-dimensional joint antenna array downlink channel measurement pilot may not be configured for the UE through the above-mentioned resource configuration approaches (1) and (2).

The above-mentioned resource configuration approaches (1) and (2) will be described hereinafter in the event that the downlink channel measurement pilot is a CSI-RS resource and the network side device includes a 4*8 antenna array (32 antennae in total).

In the resource configuration approach (1), in the event that the first downlink channel measurement pilot configured by the network side device for the UE at step 201 is a four-port CSI-RS resource, the second downlink channel measurement pilot configured for the UE is an eight-port CSI-RS resource; in the event that the first downlink channel measurement pilot configured by the network side device for the UE at step 201 is an eight-port CSI-RS resource, the second downlink channel measurement pilot configured for the UE is a four-port CSI-RS resource.

In the resource configuration approach (2), no matter whether the first downlink channel measurement pilot configured by the network side device for the UE at step 201 is a four-port CSI-RS resource, an eight-port CSI-RS resource or a thirty two-port CSI-RS resource, a thirty two-port CSI-RS resource may be configured for the UE, and this thirty two-port CSI-RS resource is the two-dimensional joint antenna array downlink channel measurement pilot.

In addition, in the event that the network side device configures the second downlink channel measurement pilot or two-dimensional joint antenna array downlink channel measurement pilot for the UE, the second RI may be, or may not be, configured for the UE. This is because it has been provided in a Long Term Evolution (LTE) standard that RI=1, and in the event that the interaction is not performed in accordance with the LTE standard, it is necessary to configure the RI if no agreement is reached between the network side device and the UE.

In order to ensure that the network side device and the UE use the same second PMI information to process relevant information (e.g., the determination of the pre-coding matrix by the network side device, and the determination of the first PMI information and the CQI information by the UE), thereby to ensure the accuracy of the CSI from the UE and the accuracy of the subsequent beamforming and signal adjustment operations, the network side device needs to confirm the second PMI information with the UE. In a possible embodiment of the present disclosure, the network side device may configure the second PMI information for the UE through one of the following two ways.

In a first way, the network side device may transmit the second PMI information to the UE, so as to: in the event that the network side device has configured the second downlink channel measurement pilot for the UE, enable the UE to determine the first PMI information based on the configured second PMI information, the first downlink channel measurement pilot and the second downlink channel measurement pilot, and in the event that the network side device has configured the two-dimensional joint antenna array downlink channel measurement pilot for the UE, enable the UE to determine the first PMI information based on the configured second PMI information and the two-dimensional joint antenna array downlink channel measurement pilot, and enable the UE to determine the CQI information based on the first PMI information and the second PMI information.

In a second way, the network side device may notify the UE to use the second PMI information determined by the UE itself, so as to: in the event that the network side device has configured the second downlink channel measurement pilot for the UE, enable the UE to determine the first PMI information based on the second PMI information determined by the UE, the first downlink channel measurement pilot and the second downlink channel measurement pilot, and in the event that the network side device has configured the two-dimensional joint antenna array downlink channel measurement pilot for the UE, enable the UE to determine the first PMI information based on the second PMI information determined by the UE and the two-dimensional joint antenna array downlink channel measurement pilot, and enable the UE to determine the CQI information based on the first PMI information and the second PMI information.

In addition, the network side device and the UE may confirm the second PMI information in any other ways, or the network side device and the UE may confirm the second PMI information based on a preset agreement (e.g., the UE may use the latest reported second PMI information, and the network side device may use the latest second PMI information reported by the UE) without any interaction.

It should be appreciated that, the network side device in the embodiments of the present disclosure may be a base station (e.g., a macro base station or a Femtocell), or a relay node (RN) device, or any other network side device.

Figure 3:
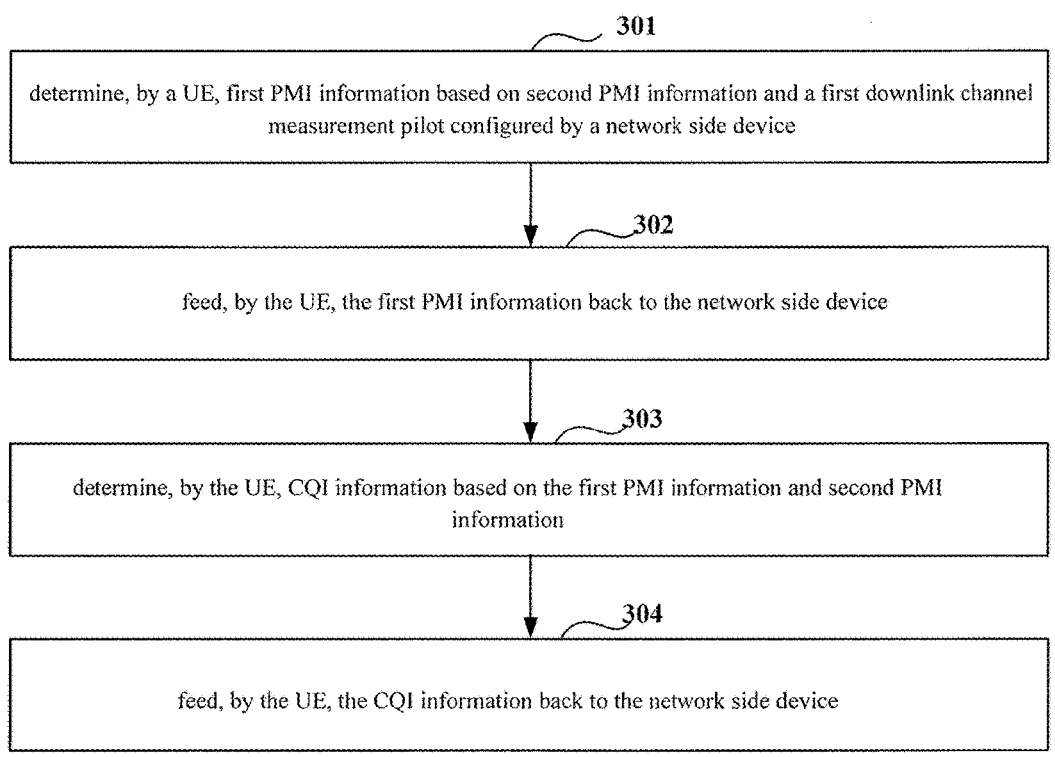
FIG. 3 is a flow chart of a CSI feedback method for a UE according to embodiments of the present disclosure.

Referring to FIG. 3, the present disclosure provides in some embodiments a CSI feedback method for a UE which includes the following steps.

Step 301: determine, by the UE, first PMI information based on second PMI information and a first downlink channel measurement pilot configured by a network side device. A dimension represented by the first PMI information is different from a dimension represented by the second PMI information.

To be specific, Step 301 may include the following Steps A1 to A4.

Step A1: determine, by the UE, first channel information based on the first downlink channel measurement pilot configured by the network side device.

Step A2: determine, by the UE, second channel information, and determine, based on the second PMI information, a beamforming vector corresponding to the second PMI information from a local beamforming vector codebook. A dimension represented by the second channel information is different from a dimension represented by the first channel information.

Step A3: determine, by the UE, the beamforming vector achieving an optimal beamforming performance from the local beamforming vector codebook based on the second channel information, the beamforming vector corresponding to the second PMI information and the code stream number RI supported by the UE.

The optimal beamforming performance refers to that, after being beamformed, the signal to be transmitted to the UE has a maximum overall throughput, a maximum SNR or a minimum block error rate.

The codebook is a set of beamforming vector elements, and an identical codebook is stored in the network side device and the UE. The codebook includes a correspondence between RI/PMI information and the beamforming vectors, and one piece of RI information and one piece of PMI information correspond to one beamforming vector. Usually, RI=1.

Further, the first PMI information may be determined using one of the following equations:

$$PMI1 = \arg opt_{PMI1=codebook\_1} f\left(\left(\frac{1}{a}H1 \otimes H2\right) \times (V1 \otimes V2)\right), \quad (1)$$

$$PMI1 = \arg opt_{PMI1=codebook\_1} f(GH2 \times V2), \text{ and} \quad (2)$$

$$PMI1 = \arg opt_{PMI1=codebook\_1} f(H \times (V1 \otimes V2)). \quad (3)$$

In equations (1), (2) and (3), PMI1 represents the first PMI information, codebook_1 represents the codebook corresponding to the first PMI information, arg opt represents the optimization of a certain function by selecting an optimal variable from a set of available variables, $f( )$ represents a beamforming performance function for the network side device, a represents a proportionality coefficient, H1 represents the first channel information, H2 represents the second channel information, V1 represents a first beamforming vector corresponding to the first PMI information, V2 represents a second beamforming vector corresponding to the second PMI information, G represents a first beamforming gain determined based on PMI1 and H1, and H represents overall channel information acquired through a function of H1 and H2 (e.g., acquired through a convolution operation on H1 and H2), e.g., $$H = f_1(H_1, H_2) \left(\text{e.g., } H = \frac{1}{a}H1 \otimes H2 \text{ or } H = \frac{1}{a}H2 \otimes H1\right).$$

Step A4: use, by the UE, the PMI corresponding to the beamforming vector achieving the optimal beamforming performance as the first PMI information.

In addition, in the event that the overall channel information may be determined based on the first downlink channel pilot measurement channel, step 301 may include the following steps B1 to B3.

Step B1: determine, by the UE, the overall channel information based on the first downlink channel pilot measurement.

Step B2: determine, by the UE, a beamforming vector corresponding to the second PMI information from a local beamforming vector codebook based on the second PMI information.

Step B3: determine, by the UE, a beamforming vector achieving an optimal beamforming performance from the local beamforming vector codebook based on the overall channel information, the beamforming vector corresponding to the second PMI information and the code stream number R1 supported by the UE. To be specific, Step B3 may be achieved through the above-mentioned equation (3).

Step 302: transmit, by the UE, the first PMI information to the network side device.

Step 303: determine, by the UE, CQI information based on the first PMI information and second PMI information.

Step 304: transmit, by the UE, the CQI information to the network side device.

It should be appreciated that, steps 303 and 304 are preferred steps in the embodiments of the present disclosure. step 303 may be performed subsequent to step 301, and in the event that step 303 is performed between step 301 and step 302, step 304 may be performed at the same time with, or subsequent to, step 302, i.e., the performing order of these steps is not limited herein.

It should be appreciated that, different from the conventional CQI information, the CQI information determined in step 303 is CQI information (e.g., highest Modulation Coding Scheme (MCS) or SNR) that may be measured by the UE in the event that the beamforming operation and the data transmission (e.g., over a Physical Downlink Shared Channel (PDSCH)) are performed by the network side device based on the first PMI information (and the first RI information) and the second PMI information (at the second RI information) reported by the UE. The conventional CQI information refers to CQI information that may be measured by the UE in the event that the beamforming operation and the downlink data transmission are performed by the network side device based on a single piece of PMI/RI information reported by the UE. The single piece of PMI/RI information is acquired by the UE through the measurement of the horizontal-dimension CSI-RS resource or the vertical-dimension CSI-RS resource.

To be specific, Step 303 may include the following steps.

Step C1: determine, by the UE, a beamforming vector corresponding to the first PMI information from a local beamforming vector codebook based on the first PMI information, and determine a beamforming vector corresponding to the second PMI information from the local beamforming vector codebook based on the second PMI information.

Step C2: determine, by the UE, first channel information and second channel information, or determining, by the UE, overall channel information. A dimension represented by the second channel information is different from a dimension represented by the first channel information, In the event that the first downlink channel measurement pilot is a two-dimension joint antenna array downlink channel measurement pilot, the UE may determine the overall channel information based on the two-dimension joint antenna array downlink channel measurement pilot, and in the event that the first downlink channel measurement pilot is not the two-dimension joint antenna array downlink channel measurement pilot, the UE may determine the first channel information based on the first downlink channel measurement pilot.

Step C3: determine, by the UE, the CQI information based on the first channel information, the second channel information, the beamforming vector corresponding to the first PMI information and the beamforming vector corresponding to the second PMI information, or determine, by the UE, the CQI information based on the overall channel information, the beamforming vector corresponding to the first PMI information and the beamforming vector corresponding to the second PMI information.

In a possible embodiment of the present disclosure, at step 303, the CQI information may be determined using one of the following equations:

$$CQI = SNR(H \times (V1 \otimes V2)), \qquad (4)$$

$$CQI = SNR\left(\left(\frac{1}{a}H1 \otimes H2\right) \times (V1 \otimes V2)\right), \qquad (5)$$

$$CQI = SNR(H \times (V1 \otimes V2)), \text{ and} \qquad (6)$$

$$CQI = SNR(GH \times V2). \qquad (7)$$

In the above-mentioned equations (4), (5), (6) and (7), SNR represents a signal-to-noise ration. Parameters G, H, a, V1, V2, H1 and H2 have meanings identical to those in the above-mentioned equations (1), (2) and (3), and thus will not be repeated herein.

In a possible embodiment of the present disclosure, the UE may determine the second PMI information in any one of the following two ways. In a first way, the UE may measure a downlink pilot signal, so as to determine the second PMI information. In a second way, the UE may determine the second PMI information based on the second PMI information transmitted from the network side device.

In the first way, the downlink pilot signal includes a CSI-RS resource or a CRS.

In a possible embodiment of the present disclosure, in the first way, the UE may measure the second downlink channel measurement pilot or the two-dimension joint antenna array downlink channel measurement pilot configured by the network side device, so as to determine the second PMI information.

The above-mentioned step 301 may include: determining, by the UE, the first PMI information based on the second PMI information, and the first downlink channel measurement pilot and the second downlink channel measurement pilot configured by the network side device; or measuring, by the UE, a downlink pilot signal based on the second PMI information and the two-dimension joint antenna array downlink channel measurement pilot configured by the network side device, so as to determine the first PMI information.

In this case, the UE may measure the downlink pilot signal based on the second downlink channel measurement pilot or the two-dimension joint antenna array downlink channel measurement pilot configured by the network side device, so as to determine the second channel information.

In a possible embodiment of the present disclosure, subsequent to the step of measuring, by the UE, the downlink pilot signal so as to determine the second PMI information, the method may further include reporting, by the UE, the determined second PMI information to the network side device.

In a possible embodiment of the present disclosure, subsequent to the step of reporting, by the UE, the determined second PMI information to the network side device, the method may further include: after receiving the second PMI information configured by the network side device, determining, by the UE, the first PMI information and the CQI information based on the second PMI information; or after receiving an acknowledgement message from the network side device, using, by the UE, the reported second PMI information as the PMI information for determining the first PMI information and the CQI information.

Advantages of the present disclosure will be described hereinafter as compared with a conventional CSI feedback method.

In the related art, the CSI measured by the UE on each CSI-RS resource merely reflects a channel state on the current CSI-RS resource, so it merely reflects a channel in one dimension. The pieces of CSI measured on the CSI-RS resources in different dimensions are completely independent of each other, so upon the receipt of the CSI information of different dimensions, the network side device may not directly use the CSI information for the 3D-MIMO downlink transmission, and instead, the network side device must acquire the downlink 3D-MIMO beamforming information and the CQI information for the downlink link adjustment based on the CSI information of different dimensions. Hence, the complexity of an eNB may be increased and the downlink transmission accuracy may be decreased.

In the embodiments of the present disclosure, the UE may determine the first PMI information based on the first downlink channel measurement pilot and the second PMI information, and feed back the first PMI information to the network side device. Upon receiving the first PMI information, the network side device may perform the beamforming operation based on the first PMI information. The UE merely needs to feed back the first PMI information to the network side device, so as compared with the related art where two independent pieces of CSI information each including RI, PMI and CQI information are provided, it is possible to remarkably reduce an uplink feedback overhead. Further, the first PMI information determined by the UE is PMI corresponding to the beamforming vector capable of achieving the optimal beamforming performance and selected from a codebook in a first dimension. The second PMI information is utilized and the PMI information corresponds to the beamforming vector capable of achieving the optimal beamforming performance, so the first PMI information from the UE may have relatively high accuracy, and in the event of performing the beamforming operation based on the first PMI information, it is possible to remarkably increase the downlink transmission accuracy. In addition, the UE may determine and feed back the CQI information based on the first PMI information and the second PMI information. The CQI information which is determined based on the first PMI information and the second PMI information may reflect the overall channel quality in different dimensions, so the network side device may directly perform the downlink adjustment on the signal to be transmitted to the UE based on the CQI information determined and fed back by the UE, and as compared with the related art where the network side device determines the CQI information based on the PMI information of different dimensions, it is possible to remarkably simplify the network side device.

Figure 4:
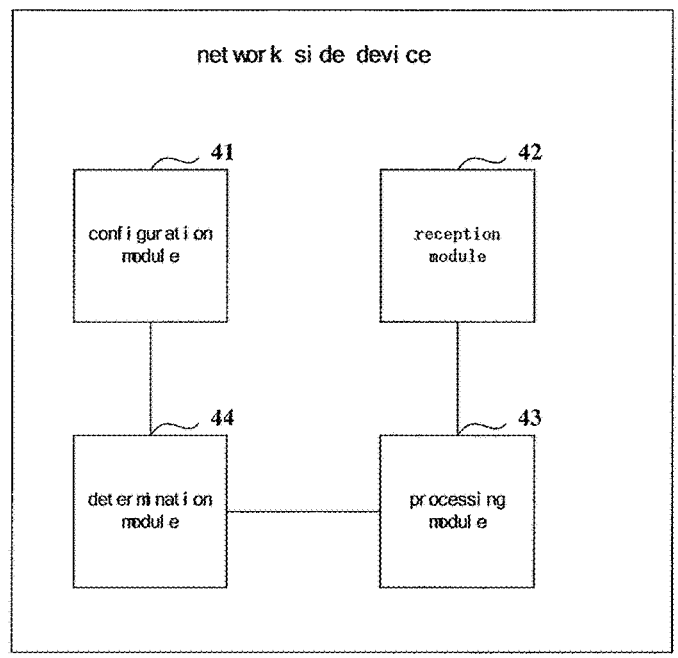
FIG. 4 is a schematic view showing a network side device according to embodiments of the present disclosure.

Referring to FIG. 4, a schematic diagram of a network side device provided by the embodiments of the present disclosure is shown. The network side device includes: a configuration module 41 configured to configure a first downlink channel measurement pilot for a UE; and a reception module 42 configured to receive first PMI information from the UE. The first PMI information is acquired by the UE based on measurement of the first downlink channel measurement pilot and second PMI information. A dimension represented by the first PMI information is different from a dimension represented by the second PMI information.

In a possible embodiment of the present disclosure, the network side device further includes a processing module 43 configured to perform a beamforming operation on a signal to be transmitted to the UE based on the first PMI information and the second PMI information.

In a possible embodiment of the present disclosure, the reception module 42 is further configured to receive CQI information from the UE. The CQI information is determined by the UE based on the first PMI information and the second PMI information.

In a possible embodiment of the present disclosure, the processing module 43 is further configured to perform link adjustment on the signal to be transmitted to the UE based on the CQI information.

In a possible embodiment of the present disclosure, the configuration module 41 is further configured to configure second PMI information for the UE, so as to enable the UE to determine the first PMI information based on the second PMI information and the first downlink channel measurement pilot and determine the CQI information based on the first PMI information and the second PMI information.

In a possible embodiment of the present disclosure, the network side device further includes a determination module 44 configured to receive the second PMI information reported by the UE; or measure an uplink signal from the UE so as to determine the second PMI information.

In a possible embodiment of the present disclosure, the configuration module 41 is further configured to, before the determination module has received the second PMI information reported by the UE, configure a second downlink channel measurement pilot for the UE, so as to enable the UE to determine the second PMI information based on the second downlink channel measurement pilot; or configure a two-dimensional joint antenna array downlink channel measurement pilot for the UE, so as to enable the UE to determine the second PMI information based on the two-dimensional joint antenna array downlink channel measurement pilot.

In a possible embodiment of the present disclosure, the configuration module 41 is further configured to: transmit the second PMI information to the UE, so as to, in the event that the network side device has configured the second downlink channel measurement pilot for the UE, enable the UE to determine the first PMI information based on the second PMI information, the first downlink channel measurement pilot and the second downlink channel measurement pilot, and in the event that the network side device has configured the two-dimensional joint antenna array downlink channel measurement pilot for the UE, enable the UE to determine the first PMI information based on the second PMI information and the two-dimensional joint antenna array downlink channel measurement pilot, and enable the UE to determine the CQI information based on the first PMI information and the second PMI information; or notify the UE to use the second PMI information determined by the UE itself, so as to, in the event that the network side device has configured the second downlink channel measurement pilot for the UE, enable the UE to determine the first PMI information based on the second PMI information determined by the UE, the first downlink channel measurement pilot and the second downlink channel measurement pilot, and in the event that the network side device has configured the two-dimensional joint antenna array downlink channel measurement pilot for the UE, enable the UE to determine the first PMI information based on the second PMI information determined by the UE and the two-dimensional joint antenna array downlink channel measurement pilot, and enable the UE to determine the CQI information based on the first PMI information and the second PMI information.

Figure 5:
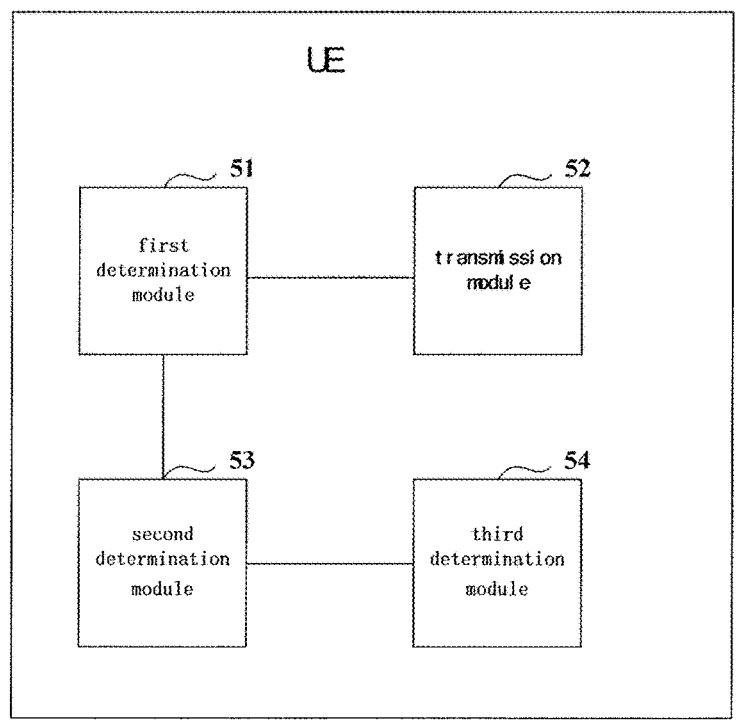
FIG. 5 is a schematic view showing a UE according to embodiments of the present disclosure.

Referring to FIG. 5, a schematic diagram of a UE provided by the embodiments of the present disclosure is shown. The UE includes a first determination module 51 and a transmission module 52. The first determination module 51 is configured to determine first PMI information based on second PMI information and a first downlink channel measurement pilot configured by a network side device. A dimension represented by the first PMI information is different from a dimension represented by the second PMI information. The transmission module 52 is configured to feed back the first PMI information to the network side device.

In a possible embodiment of the present disclosure, the first determination module 51 is further configured to determine CQI information based on the first PMI information and the second PMI information, and the transmission module 52 is further configured to feed back the CQI information to the network side device.

In a possible embodiment of the present disclosure, the UE further includes a second determination module 53 configured to measure a downlink pilot signal so as to determine the second PMI information, or determine the second PMI information based on the received second PMI information transmitted from the network side device.

In a possible embodiment of the present disclosure, the second determination module 53 is further configured to measure a two-dimensional joint antenna array downlink channel measurement pilot or a second downlink channel measurement pilot configured by the network side device, so as to determine the second PMI information. The first determination module 51 is further configured to determine the first PMI information based on the second PMI information and the second downlink channel measurement pilot and the first downlink channel measurement pilot configured by the network side device, or measure the downlink pilot signal based on the second PMI information and the two-dimensional joint antenna array downlink channel measurement pilot configured by the network side device so as to determine the first PMI information.

In a possible embodiment of the present disclosure, the transmission module 52 is further configured to, after the second determination module has measured the downlink pilot signal and determined the second PMI information, report the determined second PMI information to the network side device.

In a possible embodiment of the present disclosure, the UE further includes a third determination module 54 configured to: after the transmission module has reported the determined second PMI information to the network side device, upon the receipt of the second PMI information from the network side device, use the received second PMI information as the second PMI information used for determining the first PMI information and the CQI information; or upon the receipt of an acknowledgement message from the network side device, use the reported second PMI information as the second PMI information used for determining the first PMI information and the CQI information.

Figure 6:
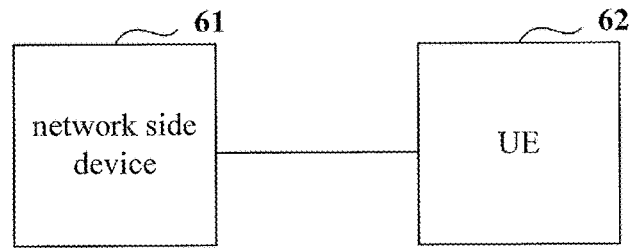
FIG. 6 is a schematic view showing a CSI feedback system according to embodiments of the present disclosure.

Referring to FIG. 6, a CSI feedback system provided by the embodiments of the present disclosure is shown. The CSI feedback system includes a network side device 61 and a UE 62. The network side device 61 is configured to configure a first downlink channel measurement pilot for the UE, and receive first PMI information from the UE. A dimension represented by the first PMI information is different from a dimension represented by the second PMI information. The UE 62 is configured to determine the first PMI information based on second PMI information and the first downlink channel measurement pilot configured by the network side device, and feed back the first PMI information to the network side device.

In a possible embodiment of the present disclosure, the network side device 61 is further configured to perform a beamforming operation on a signal to be transmitted to the UE based on the first PMI information and the second PMI information.

In a possible embodiment of the present disclosure, the network side device 61 is further configured to receive CQI information from the UE, and the UE 62 is further configured to determine the CQI information based on the first PMI information and the second PMI information and feed back the CQI information to the network side device.

In a possible embodiment of the present disclosure, the network side device 61 is further configured to perform a link adjustment on the signal to be transmitted to the UE based on the CQI information.

In a possible embodiment of the present disclosure, the network side device 61 is further configured to configure the second PMI information for the UE, so as to enable the UE to determine the first PMI information based on the second PMI information and the first downlink channel measurement pilot configured for the UE and determine the CQI information based on the first PMI information and the second PMI information configured for the UE. The UE 62 is further configured to measure a downlink pilot signal so as to determine the second PMI information, or determine the second PMI information based on the second PMI information configured by the network side device.

In a possible embodiment of the present disclosure, the network side device 61 is further configured to receive the second PMI information reported by the UE, or measure an uplink signal from the UE so as to determine the second PMI information. The UE 62 is further configured to measure the downlink pilot signal so as to determine the second PMI information, and then report the determined second PMI information to the network side device.

In a possible embodiment of the present disclosure, the network side device 61 is further configured to receive the second PMI information reported by the UE, or measure the uplink signal form the UE so as to determine the second PMI information.

The UE 62 is further configured to report the determined second PMI information to the network side device.

In a possible embodiment of the present disclosure, the network side device 61 is further configured to, before receiving the second PMI information reported by the UE, configure a second downlink channel measurement pilot for the UE, so as to enable the UE to determine the second PMI information based on the second downlink channel measurement pilot; or configure a two-dimensional joint antenna array downlink channel measurement pilot for the UE, so as to enable the UE to determine the second PMI information based on the two-dimensional joint antenna array downlink channel measurement pilot. The UE 62 is further configured to measure the second downlink channel measurement pilot or the two-dimensional joint antenna array downlink channel measurement pilot configured by the network side device, so as to determine the second PMI Information; and determine the first PMI information based on the second PMI information and the first downlink channel measurement pilot and the second downlink channel measurement pilot configured by the network side device, or measure a downlink pilot signal based on the second PMI information and the two-dimensional joint antenna array downlink channel measurement pilot configured by the network side, so as to determine the first PMI information.

In a possible embodiment of the present disclosure, the network side device 61 is further configured to transmit the second PMI information to the UE, so as to, in the event that the network side device has configured the second downlink channel measurement pilot for the UE, enable the UE to determine the first PMI information based on the second PMI information, the first downlink channel measurement pilot and the second downlink channel measurement pilot, and in the event that the network side device has configured the two-dimensional joint antenna array downlink channel measurement pilot for the UE, enable the UE to determine the first PMI information based on the second PMI information and the two-dimensional joint antenna array downlink channel measurement pilot, and enable the UE to determine the CQI information based on the first PMI information and the second PMI information; or notify the UE to use the second PMI information determined by the UE itself, so as to, in the event that the network side device has configured the second downlink channel measurement pilot for the UE, enable the UE to determine the first PMI information based on the second PMI information determined by the UE, the first downlink channel measurement pilot and the second downlink channel measurement pilot, and in the event that the network side device has configured the two-dimensional joint antenna array downlink channel measurement pilot for the UE, enable the UE to determine the first PMI information based on the second PMI information determined by the UE and the two-dimensional joint antenna array downlink channel measurement pilot, and enable the UE to determine the CQI information based on the first PMI information and the second PMI information determined by the UE.

The UE 62 is further configured to, after the determined second PMI information has been reported to the network side device, upon the receipt of the second PMI information from the network side device, use the received second PMI information as the second PMI information used for determining the first PMI information and the CQI information; or upon the receipt of an acknowledgement message from the network side device, use the reported second PMI information as the second PMI information used for determining the first PMI information and the CQI information.

The structures and processing of the network side device and the UE will be described hereinafter in conjunction with preferred hardware structures.

Figure 7:
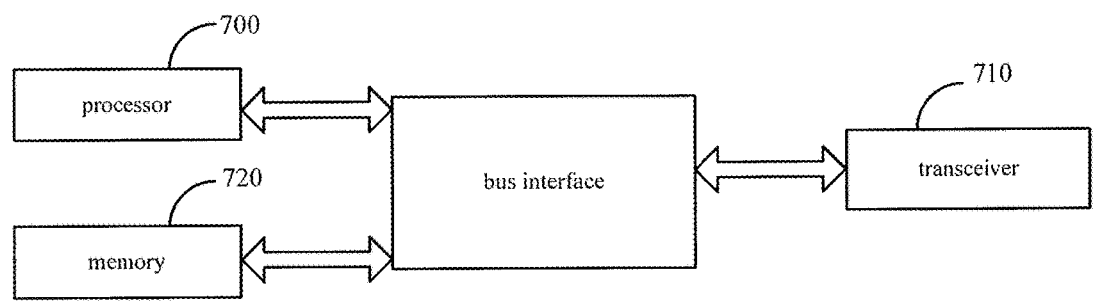
FIG. 7 is a schematic view showing another network side device according to embodiments of the present disclosure.

Referring to FIG. 7, a schematic diagram of another network side device provided by the embodiments of the present disclosure is shown. The network side device includes a processor 700, a transceiver 710 and a memory 720 which communicate with each other via a bus interface. The processor 700 is configured to read programs stored in the memory 720, so as to configure a first downlink channel measurement pilot for a UE, and receive first PMI information from the UE through the transceiver 710. The first PMI information is acquired by the UE based on measurement of the first downlink channel measurement pilot and second PMI information. A dimension represented by the first PMI information is different from a dimension represented by the second PMI information.

The transceiver 710 is configured to receive and transmit data under the control of the processor 700.

In a possible embodiment of the present disclosure, the processor 700 is further configured to read the programs stored in the memory 720, so as to perform a beamforming operation on a signal to be transmitted to the UE based on the first PMI information and the second PMI information.

In a possible embodiment of the present disclosure, the processor 700 is further configured to read the programs stored in the memory 720, so as to receive CQI information fed back by the UE through the transceiver 710. The CQI information is determined by the UE based on the first PMI information and the second PMI information.

In a possible embodiment of the present disclosure, the processor 700 is further configured to read the programs stored in the memory 720, so as to perform a link adjustment on the signal to be transmitted to the UE based on the CQI information.

In a possible embodiment of the present disclosure, the processor 700 is further configured to read the programs stored in the memory 720, so as to configure second PMI information for the UE, so as to enable the UE to determine the first PMI information based on the second PMI information configured for the UE and the first downlink channel measurement pilot and determine the CQI information based on the first PMI information and the second PMI information configured for the UE.

In a possible embodiment of the present disclosure, the processor 700 is further configure dot read the programs stored in the memory 720, so as to receive the second PMI information reported by the UE through the transceiver 710, or measure an uplink signal from the UE so as to determine the second PMI information.

In a possible embodiment of the present disclosure, the processor 700 is further configured to read the programs stored in the memory 720, so as to, before the second PMI information reported by the UE has been received through the transceiver 710, configure a second downlink channel measurement pilot for the UE, so as to enable the UE to determine the second PMI information based on the second downlink channel measurement pilot; or configure a two-dimensional joint antenna array downlink channel measurement pilot for the UE, so as to enable the UE to determine the second PMI information based on the two-dimensional joint antenna array downlink channel measurement pilot.

In a possible embodiment of the present disclosure, the processor 700 is further configured to read the programs stored in the memory 720, so as to: transmit the second PMI information to the UE through the transceiver 710, so as to, in the event that the network side device has configured the second downlink channel measurement pilot for the UE, enable the UE to determine the first PMI information based on the configured second PMI information, the first downlink channel measurement pilot and the second downlink channel measurement pilot, and in the event that the network side device has configured the two-dimensional joint antenna array downlink channel measurement pilot for the UE, enable the UE to determine the first PMI information based on the configured second PMI information and the two-dimensional joint antenna array downlink channel measurement pilot, and enable the UE to determine the CQI information based on the first PMI information and the configured second PMI information; or transmit an acknowledgement message to the UE through the transceiver 710, so as to, in the event that the network side device has configured the second downlink channel measurement pilot for the UE, enable the UE to determine the first PMI information based on the second PMI information determined by the UE, the first downlink channel measurement pilot and the second downlink channel measurement pilot, and in the event that the network side device has configured the two-dimensional joint antenna array downlink channel measurement pilot for the UE, enable the UE to determine the first PMI information based on the second PMI information determined by the UE and the two-dimensional joint antenna array downlink channel measurement pilot, and enable the UE to determine the CQI information based on the first PMI information and the second PMI information determined by the UE.

In FIG. 7, the bus architecture may include any number of buses and bridges connected to each other, so as to connect various circuits for one or more processors presented by the processor 700 and one or more memories presented by the memory 720. In addition, as is known in the art, the bus architecture may be used to connect any other circuits, such as a circuit of a peripheral device, a circuit of a voltage stabilizer and a power management circuit, which will not be repeated herein. Bus interfaces are provided, and the transceiver 710 may consist of more than one element, e.g., transmitters and receivers for communication with any other devices over a transmission medium. The processor 700 may take charge of managing the bus architecture as well as general processing. The memory 720 may store data for the operation of the processor 700.

Figure 8:
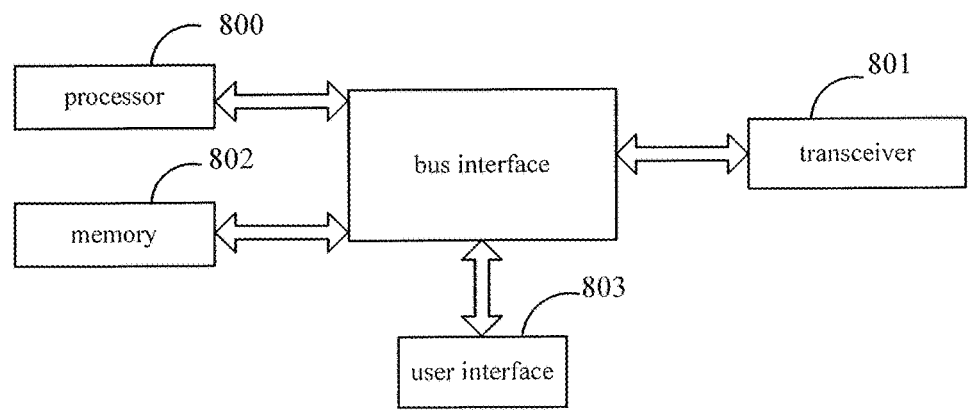
FIG. 8 is a schematic view showing another UE according to embodiments of the present disclosure.

Referring to FIG. 8, a schematic diagram of another UE provided by the embodiments of the present disclosure. The UE includes a processor 800, a transceiver 801, a memory 802 and a user interface 803. The processor 800 is configured to read programs stored in the memory 802, so as to determine first PMI information based on second PMI information and a first downlink channel measurement pilot configured by a network side device, and transmit the first PMI information to the network side device through the transceiver 801. A dimension represented by the first PMI information is different from a dimension represented by the second PMI information.

The transceiver 801 is configured to receive and transmit data under the control of the processor 800.

In a possible embodiment of the present disclosure, the processor 800 is further configured to read the programs stored in the memory 802, so as to determine CQI information based on the first PMI information and the second PMI information, and feed back the CQI information to the network side device trough the transceiver 801.

In a possible embodiment of the present disclosure, the processor 800 is further configured to read the programs stored in the memory 802, so as to measure a downlink pilot signal and determine the second PMI information, or determine the second PMI information based on the received second PMI information issued from the network side device through the transceiver 801.

In a possible embodiment of the present disclosure, the processor 800 is further configured to read the programs stored in the memory 802, so as to: measure a second downlink channel measurement pilot or a two-dimensional joint antenna array downlink channel measurement pilot configured by the network side device, determine the second PMI information; and determine the first PMI information based on the second PMI information and the first downlink channel measurement pilot and the second downlink channel measurement pilot configured by the network side device, or measure the downlink pilot signal based on the second PMI information and the two-dimensional joint antenna array downlink channel measurement pilot configured by the network side device so as to determine the first PMI information.

In a possible embodiment of the present disclosure, the processor 800 is further configured to read the programs stored in the memory 802, so as to, after measuring the downlink pilot signal and determining the second PMI information, report the determined second PMI information to the network side device through the transceiver 801.

In a possible embodiment of the present disclosure, the processor 800 is further configured to, after the determined second PMI information has been reported to the network side device through the transceiver 801, read the programs stored in the memory 802, so as to: upon the receipt of the second PMI information from the network side device, use the received second PMI information as the second PMI information used for determining the first PMI information and the CQI information; or upon receiving through the transceiver 801 an acknowledgement message from the network side device, use the reported second PMI information as the second PMI information used for determining the first PMI information and the CQI information.

In FIG. 8, the bus architecture may include any number of buses and bridges connected to each other, so as to connect various circuits for one or more processors represented by the processor 800 and one or more memories represented by the memory 802. In addition, as is known in the art, the bus architecture may be used to connect any other circuits, such as a circuit of a peripheral device, a circuit of a voltage stabilizer and a power management circuit, which will not be defined herein. Bus interfaces are provided, and the transceiver 1201 may consist of more than one element, e.g., a transmitter and a receiver for communication with any other devices over a transmission medium. With respect to different UEs, the user interface 803 may also be provided for devices which are arranged inside or outside the UE, and these devices may include, but not limited to, a keypad, a display, a speaker, a microphone and a joystick.

The processor 800 may take charge of managing the bus architecture as well as general processing. The memory 802 may store data for the operation of the processor 800.

Apparently, a person skilled in the art may make further modifications and variations without departing from the spirit and the scope of the present disclosure. The present disclosure is intended to embrace such variations and variations if these modifications and variations of this disclosure are within the scope defined by the claims of the present disclosure and the equivalents thereof.

What is claimed is:

1. A Channel State Information (CSI) feedback method, comprising:
   configuring, by a network side device, a first downlink channel measurement pilot for a User Equipment (UE);
   receiving, by the network side device, first Pre-coding Matrix Indicator (PMI) information fed back by the UE; and
   configuring, by the network side device, second Pre-coding Matrix Indicator (PMI) for the UE to enable the UE to determine the first PMI information based on the second PMI information configured for the UE and the first downlink channel measurement pilot and determine the CQI information based on the first PMI information and the second PMI information configured for the UE, wherein the first PMI information being acquired by the UE based on measurement of the first downlink channel measurement pilot and second PMI information, and wherein a dimension represented by the first PMI information is different from a dimension represented by the second PMI information.

2. The CSI feedback method according to claim 1, further comprising: performing, by the network side device, a beamforming operation on a signal to be transmitted to the UE based on the first PMI information and the second PMI information.

3. The CSI feedback method according to claim 1, further comprising: receiving, by the network side device, Channel Quality Indicator (CQI) information fed back by the UE, the CQI information being determined by the UE based on the first PMI information and the second PMI information.

4. The CSI feedback method according to claim 3, further comprising: performing, by the network side device, a link adjustment on the signal to be transmitted to the UE based on the CQI information.

5. The CSI feedback method according to claim 1, wherein a step of determining, by the network side device, the second PMI information comprises:
  receiving, by the network side device, the second PMI information reported by the UE; or
  measuring, by the network side device, an uplink signal from the UE to determine the second PMI information.

6. The CSI feedback method according to claim 5, further comprising, prior to receiving, by the network side device, the second PMI information reported by the UE:
  configuring, by the network side device, a second downlink channel measurement pilot for the UE to enable the UE to determine the second PMI information based on the second downlink channel measurement pilot; or
  configuring, by the network side device, a two-dimensional joint antenna array downlink channel measurement pilot for the UE to enable the UE to determine the second PMI information based on the two-dimensional joint antenna array downlink channel measurement pilot.

7. The CSI feedback method according to claim 6, wherein the configuring, by the network side device, second PMI information for the UE comprises:
  transmitting, by the network side device, the second PMI information to the UE to enable the UE to determine the first PMI information based on the received second PMI information, the first downlink channel measurement pilot and the second downlink channel measurement pilot in the event that the network side device configures the second downlink channel measurement pilot for the UE, and enable the UE to determine the first PMI information based on the received second PMI information and the two-dimensional joint antenna array downlink channel measurement pilot in the event that the network side device configures the two-dimensional joint antenna array downlink channel measurement pilot for the UE; or
  notifying, by the network side device, the UE to use the second PMI information determined by the UE to enable the UE to determine the first PMI information based on the second PMI information determined by the UE, the first downlink channel measurement pilot and the second downlink channel measurement pilot in the event that the network side device configures the second downlink channel measurement pilot for the UE, and enable the UE to determine the first PMI information based on the second PMI information determined by the UE and the two-dimensional joint antenna array downlink channel measurement pilot in the event that the network side device configures the two-dimensional joint antenna array downlink channel measurement pilot for the UE.

8. A Channel State Information (CSI) feedback method, comprising:
  determining, by a User Equipment (UE), first Pre-coding Matrix Indicator (PMI) information;
  feeding, by the UE, the first PMI information back to the network side device; and
  determining, by the UE, second Pre-coding Matrix Indicator (PMI) information,
  wherein the first PMI information is determined based on the second PMI information and a first downlink channel measurement pilot configured by a network side device to enable the UE to determine the first PMI information based on the second PMI information configured for the UE and the first downlink channel measurement pilot and determine the CQI information based on the first PMI information and the second PMI information configured for the UE, and
  wherein a dimension represented by the first PMI information is different from a dimension represented by the second PMI information.

9. The CSI feedback method according to claim 8, further comprising:
  determining, by the UE, Channel Quality Indicator (CQI) information based on the first PMI information and the second PMI information; and
  feeding, by the UE, the CQI information back to the network side device.

10. The CSI feedback method according to claim 8, wherein a step of determining, by the UE, the second PMI information comprises:
  measuring, by the UE, a downlink pilot signal to determine the second PMI information; or
  determining, by the UE, the second PMI information based on second PMI information configured by the network side device.

11. The CSI feedback method according to claim 10, wherein the measuring, by the UE, a downlink pilot signal to determine the second PMI information comprises:
  measuring, by the UE, a second downlink channel measurement pilot or a two-dimensional joint antenna array downlink channel measurement pilot configured by the network side device to determine the second PMI information, and
  the determining, by the UE, first PMI information based on second PMI information and a first downlink channel measurement pilot configured by a network side device comprises:
  determining, by the UE, the first PMI information based on the second PMI information, and the first downlink channel measurement pilot configured by the network side and the second downlink channel measurement pilot; or
  measuring, by the UE, a downlink pilot signal based on the second PMI information and the two-dimensional joint antenna array downlink channel measurement pilot configured by the network side device to determine the first PMI information.

12. The CSI feedback method according to claim 10, further comprising, subsequent to the step of measuring, by the UE, the downlink pilot signal to determine the second PMI information:

reporting, by the UE, the determined second PMI information to the network side device.

13. The CSI feedback method according to claim 12, further comprising, subsequent to the step of reporting, by the UE, the determined second PMI information to the network side device:

after the UE receives the second PMI information from the network side device, using the received second PMI information as second PMI information for determining the first PMI information and the CQI information; or after the UE receives an acknowledgement message from the network side device, using the reported second PMI information as second PMI information for determining the first PMI information and the CQI information.

14. A network side device, comprising:

a processor;

a memory connected to the processor via a bus interface and configured to store programs and data used when the processor performs an operation; and a transceiver connected to the processor and the memory via the bus interface and configured to receive and transmit data under the control of the processor, wherein the processor is further configured to call and execute the programs and data stored in the memory to: configure a first downlink channel measurement pilot for a User Equipment (UE), receive first PMI information from the UE, and configure second Pre-coding Matrix Indicator (PMI) for the UE to enable the UE to determine the first PMI information based on the second PMI information configured for the UE and the first downlink channel measurement pilot and determine the CQI information based on the first PMI information and the second PMI information configured for the UE, wherein the first PMI information is acquired by the UE based on measurement of the first downlink channel measurement pilot and second PMI information, and a dimension represented by the first PMI information is different from a dimension represented by the second PMI information.

15. The network side device according to claim 14, wherein the processor further performs a beamforming operation on a signal to be transmitted to the UE based on the first PMI information and the second PMI information.

16. The network side device according to claim 14, wherein the processor further receives Channel Quality Indicator (CQI) information fed back by the UE, the CQI information being determined by the UE based on the first PMI information and the second PMI information.

17. A User Equipment (UE), comprising:

a processor;

a memory connected to the processor via a bus interface and configured to store programs and data used when the processor performs an operation; and a transceiver connected to the processor and the memory via the bus interface and configured to receive and transmit data under the control of the processor, wherein the processor is further configured to call and execute the programs and data stored in the memory to: determine first Pre-coding Matrix Indicator (PMI) information, feed the first PMI information back to the network side device, and determine second Pre-coding Matrix Indicator (PMI) information, wherein the first PMI information is determined based on the second PMI information and a first downlink channel measurement pilot configured by a network side device to enable the UE to determine the first PMI information based on the second PMI information configured for the UE and the first downlink channel measurement pilot and determine the CQI information based on the first PMI information and the second PMI information configured for the UE, and a dimension represented by the first PMI information is different from a dimension represented by the second PMI information.

18. The UE according to claim 17, wherein the processor further determines Channel Quality Indicator (CQI) information based on the first PMI information and the second PMI information; and feeds the CQI information back to the network side device.

19. The UE according to claim 17, wherein the processor further measures a downlink pilot signal to determine the second PMI information; or determines the second PMI information based on second PMI information configured by the network side device.

* * * * *